United States Patent [19]

Mou et al.

[11] Patent Number: 6,101,401
[45] Date of Patent: Aug. 8, 2000

[54] WIRELESS TELEPHONE DIALING METHOD

[75] Inventors: Michael Mou; Tien-En Chen, both of Tu-Cheng, Taiwan

[73] Assignee: DBTEL Incorporated, Taipei Hsien, Taiwan

[21] Appl. No.: 09/140,765

[22] Filed: Aug. 26, 1998

[51] Int. Cl.[7] .................................................. H04M 1/00
[52] U.S. Cl. .......................... 455/564; 455/565; 379/355; 379/216
[58] Field of Search .................................. 455/564, 565, 455/575, 462, 465, 550, 517, 422; 379/354–359, 216

[56] References Cited

U.S. PATENT DOCUMENTS

| | | | |
|---|---|---|---|
| 5,485,149 | 1/1996 | Takiguchi | 340/825.44 |
| 5,485,513 | 1/1996 | Goedken et al. | 379/355 |
| 5,600,324 | 2/1997 | Reed et al. | 341/176 |
| 5,722,087 | 2/1998 | Ala-Mursula et al. | 455/564 |
| 5,859,913 | 1/1999 | Goreta et al. | 380/52 |
| 5,966,436 | 10/1999 | Kim | 379/216 |

*Primary Examiner*—Nguyen Vo
*Assistant Examiner*—Duc Nguyen
*Attorney, Agent, or Firm*—Rosenberg, Klein & Lee

[57] ABSTRACT

A wireless telephone dialing method in which the handset transmits a key number and an accompanied identification code to the base repeatedly when one number key of the handset is clicked, and the base, upon receipt of the signal from the handset, compares the accompanied identification code with an identification code stored therein so as to judge if the key number has been dialed to the telecommunication company or not, and to prevent a miss of the transmission of a key number.

9 Claims, 5 Drawing Sheets

WIRELESS TELEPHONE DIALING METHOD

BACKGROUND OF THE INVENTION

1. Field of the Invention

This invention is related to an improved wireless telephone dialing method.

2. Description of the Prior Art

Referring to FIG. 1, the handset of a regular wireless telephone comprises a microcontroller 101 which controls the execution of the functions of dialing, setting, control, data processing and signal processing of the handset. When communicating with the base of the wireless telephone, the microcontroller 101 drives a modulator and transmitter circuit 102 to modulate input signal into a radio signal, enabling it to be sent to the base of the wireless telephone by radio through a transmitting antenna 103. The radio signal from the handset is then received by a receiving antenna 104 of the base, and then demodulated by a receiver and demodulator circuit 106, and then sent to a dialing circuit 107 to dial the assigned telephone number. When a telephone number is dialed through the handset and transmitted to the base by radio, outside noise may interfere with the radio signal, causing the base unable to accurately dial the assigned telephone number. In order to eliminate this problem, there is developed a dialing method of transmitting one key number to the base twice when the user dialing the handset, then delaying 40 ms before sending a next key number. If the first transmission of one key number is interfered, the second transmission of the same key number can still be received by the base of the wireless telephone. Because of a 40 ms time delay between each two key numbers, a following secondary transmission code (which comes after the primary transmission code within 40 ms) will not be received by the base of the wireless telephone. Therefore, the problem of a repeat dialing is eliminated. The control flow of this wireless telephone dialing method is as shown in FIG. 1. Before the handset dials a number, it is checked if the handset and the base has been linked (block 11), i.e., the handset and the base proceed a communication protocol talk to confirm the code, the communication channel and the effective communication distance, and then start other actions. Thereafter, it proceeds to block 12 to check if a transmission code is to be transmitted from the handset to the base or not, i.e., to wait for dialing. For example, when a key of the handset is clicked, it means a transmission code is to be transmitted to the base. The handset has number keys and function keys. If the user wishes to communicate with a person at a remote place through the wireless telephone, the number keys shall be clicked. If one number key is clicked, it is recognized a dialing code (block 13). In order to prevent a miss of the transmission of number code of the clicked number key, the code is transmitted to the base twice (block 14). Then, it proceeds to block 15 where a 40 ms time delay is provided, and then to block 17 to run a function processing procedure for example dialing a next key number. Upon receipt of a code from the handset (block 18), the base identifies if the received code is a dialing code or not (block 19), then enters block 191 to dial the number when a dialing code is identified, and then enters block 192 to delay 40 ms. If the code from the handset is not a dialing code, the base decodes and runs the function code (block 193). After block 192 or block 193, the base enters block 194 to run function processing procedures. The aforesaid dialing method eliminates a dialing miss, however because the transmission of a transmission code to the base takes about 30 ms, it takes about 60 ms when continuously transmit two transmission codes to the base. If the primary transmission code is interfered and the data is destroyed, the following secondary transmission code may be simultaneously interfered and become unable to be identified. Because the length of the time delay cannot be last for long, normally designed at 40 ms, the base may make a wrong judgment when a code is repeatedly transmitted from the handset to the base three times, thereby causing a number to be repeatedly dialed.

SUMMARY OF THE INVENTION

It is one object of the present invention to provide a wireless telephone dialing method which eliminates a miss of signal transmission between the handset and the base. It is another object of the present invention to provide a wireless telephone dialing method which eliminates the problem of the repeat dialing of a key number. According to one aspect of the present invention, when the handset of the wireless telephone transmits a key number to the base of the wireless telephone, the handset is driven to set an identification code for the key number, permitting the identification code to be transmitted with the key number to the base repeatedly for a number of times, and the base is driven to set the identification code stored therein as the identification code of the key number when the identification code stored therein is unequal to the identification code of key number received from the handset and then to decode the received key number and then to dial the key number. According to another aspect of the present invention, the setting of the identification code for the key number at the handset is controlled by a microcontroller installed in the handset, and the set identification code is stored in a memory unit of the microcontroller; the identification code for the key number is the order of the key number being clicked. According to still another aspect of the present invention, the key number and the accompanied identification code are modulated into a radio signal by a modulator and transmitter circuit in the handset by means of the control of the microcontroller of the handset, and then transmitted to the base through a transmitting antenna at the handset. According to still another aspect of the present invention, the radio signal transmitted from the transmitting antenna at the handset is received by a receiving antenna at the base, then demodulated into a digital signal by a receiver and demodulator circuit in the base, and then sent to a microcontroller in the base for dialing. According to still another aspect of the present invention, the identification code stored in the base is stored in a memory unit in the base, the memory of the base recording the value of the identification code stored in the base and comparing it with the value of a next identification code received from the handset. According to still another aspect of the present invention, the identification code of the base is set as the identification code of the key number received from the handset, the identification code of the key number is stored in the memory unit of the base. According to still another aspect of the present invention, when the identification code of the key number received from the handset is equal to the identification code stored in the base, the base runs a function processing procedure. According to still another aspect of the present invention, the receiver and demodulator circuit of the base is controlled by the microcontroller of the base to demodulate the radio signal of the key number received from the handset. According to a yet further aspect of the present invention, the microcontroller of the base drives a dialing circuit of the base to dial the digital signal of the key number received from the handset. The aforesaid microcontrollers, memory units, dialing circuit, antennas, etc., can easily be achieved by conventional techniques.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
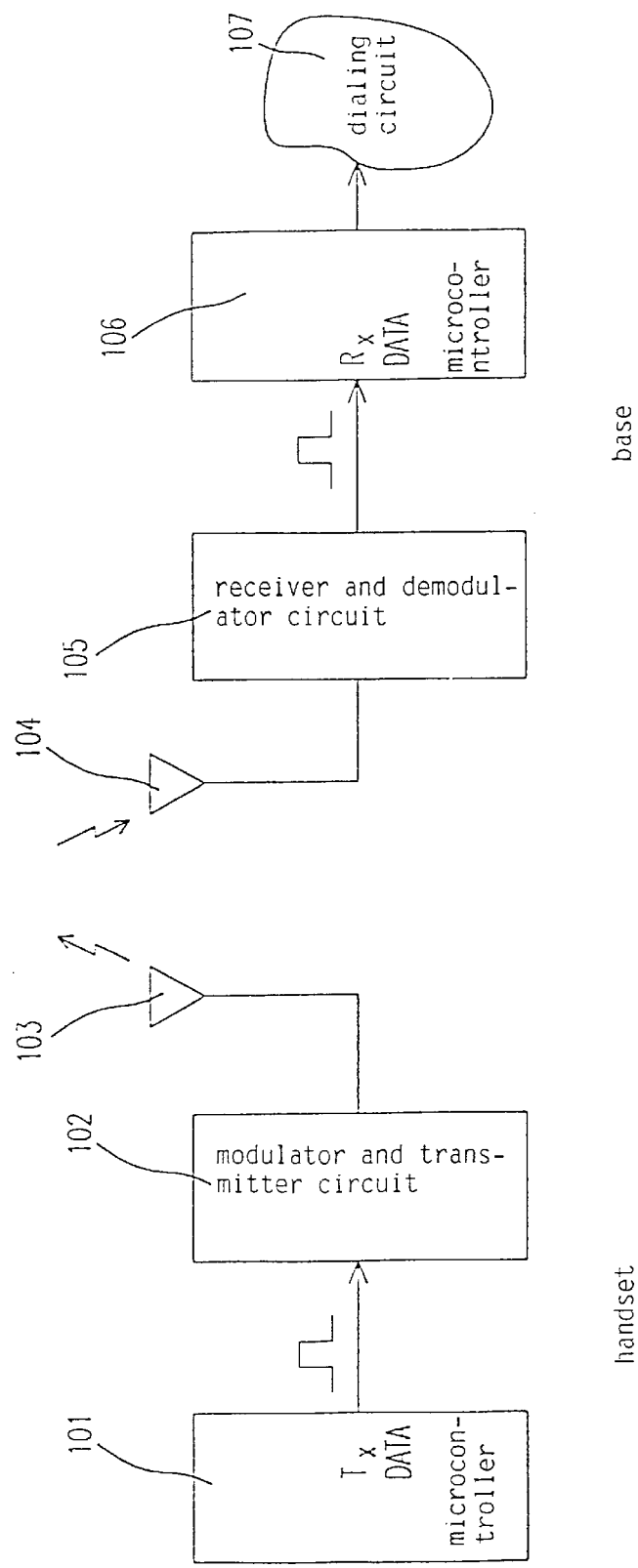
FIG. 1 is a system block diagram of a wireless telephone according to the prior art.
Figure 2:
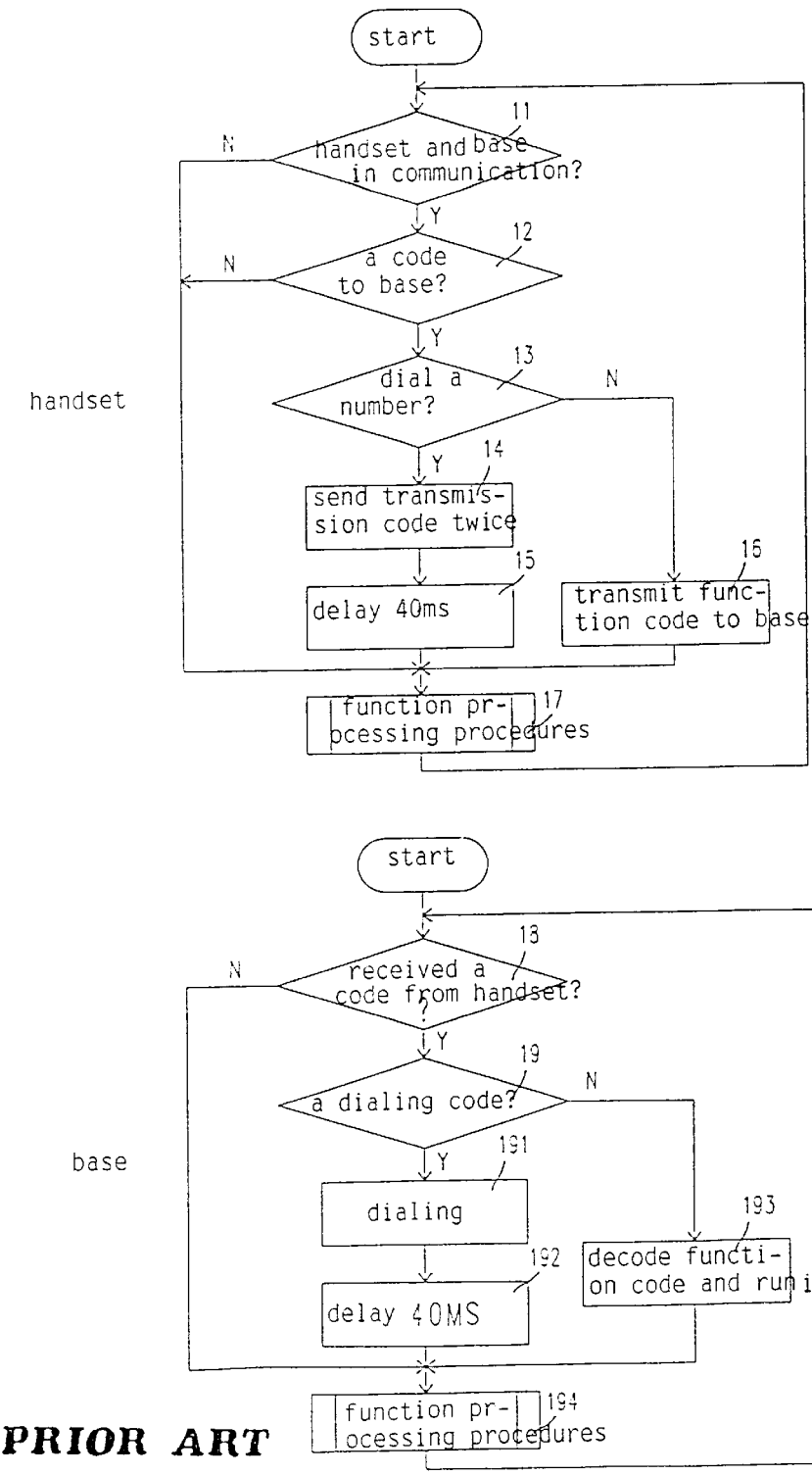
FIG. 2 is a dialing control flow according to the prior art.
Figure 3:
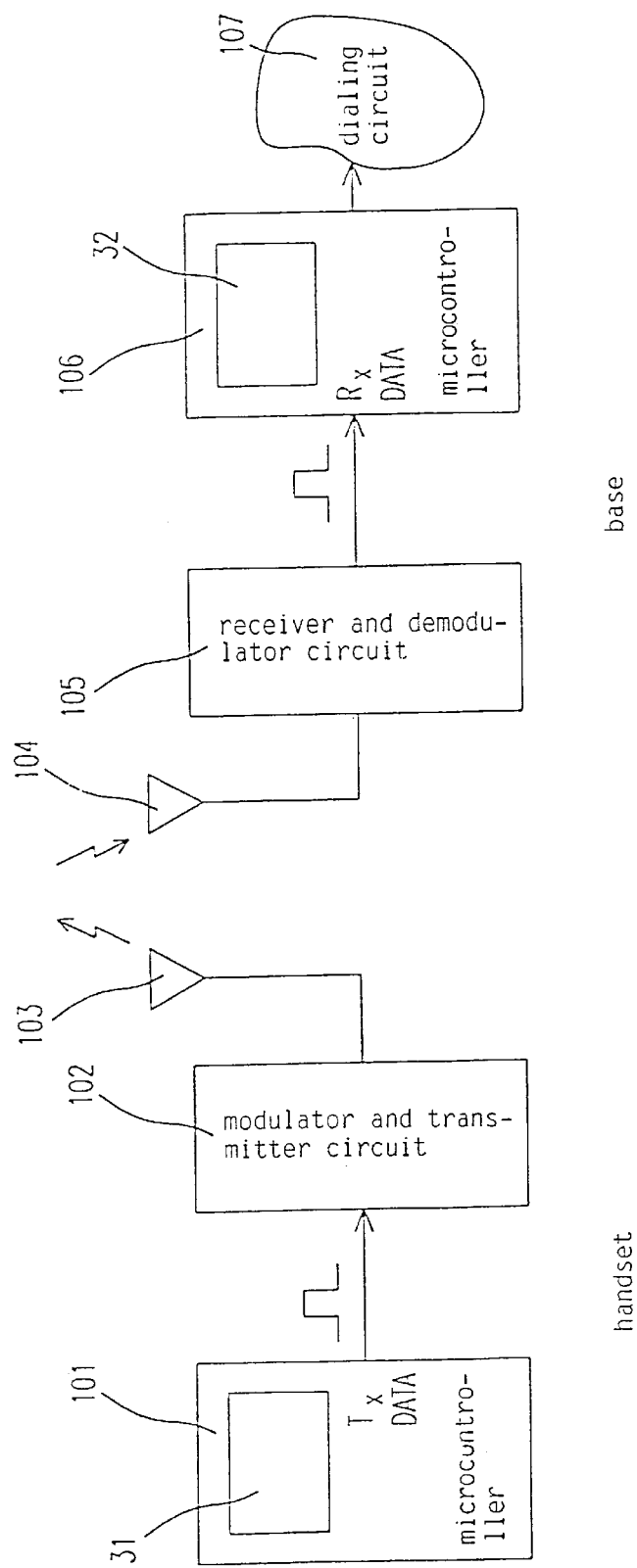
FIG. 3 is a system block diagram of a wireless telephone according to the present invention.

Referring to FIG. 3, the handset of the wireless telephone comprises a microcontroller 101 which controls the execution of the functions of dialing, setting, control, data processing and signal processing of the handset. When communicating with the base of the wireless telephone, the microcontroller 101 drives a modulator and transmitter circuit 102 to modulate input signal into a radio signal, enabling it to be sent to the base of the wireless telephone by radio through a transmitting antenna 103. The radio signal from the handset is then received by a receiving antenna 104 of the base, and then demodulated by a receiver and demodulator circuit 106, and then sent to a dialing circuit 107 to dial the assigned telephone number. The microcontroller 101 of the handset comprises a memory unit 31 for setting an identification code for each key number. The microcontroller 106 of the base comprises a memory unit 32 for recording the identification code of the last key number. When the base receives an identification code, it is compared with the last identification code stored in the memory unit 32, and the base does not dial the number if both identification codes are identical. If the identification code duly received is not equal to the identification code stored in the memory unit 32, it means the duly received identification code is a new key number, which must be decoded and then dialed.

Figure 4:
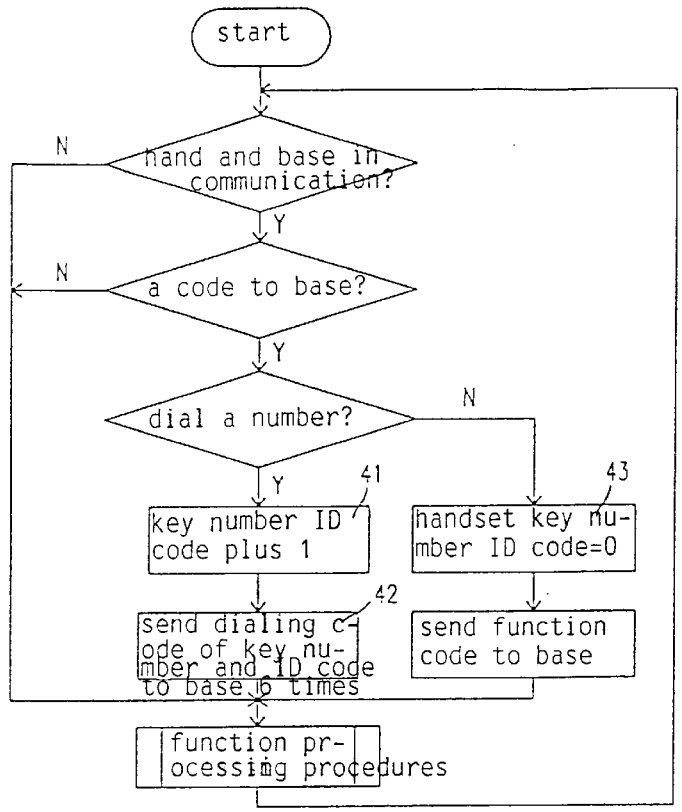
FIG. 4 is a dialing control flow according to the present invention.
Figure 4:
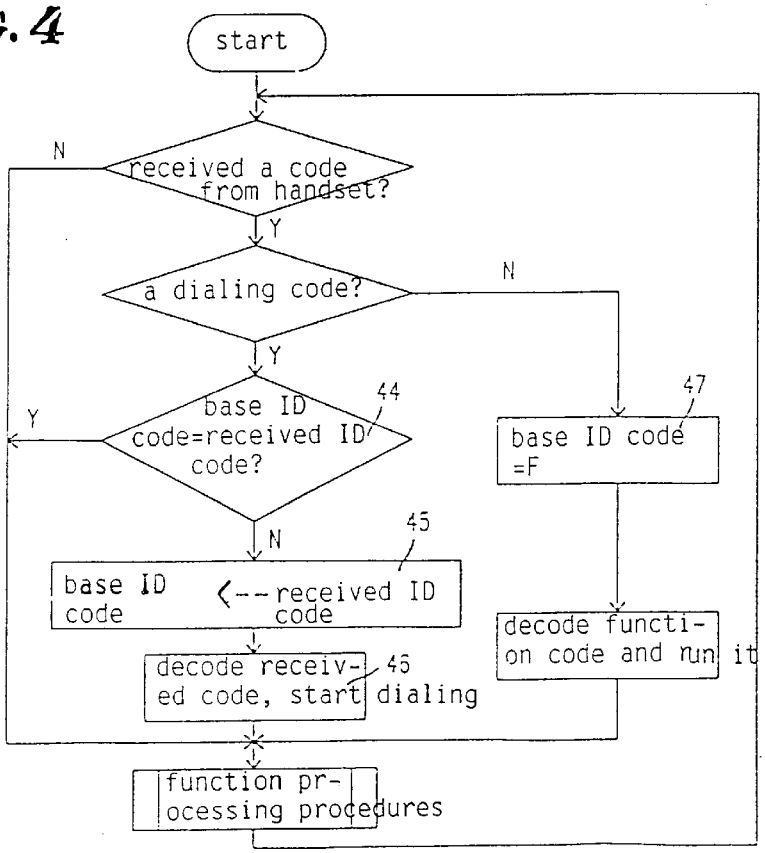

Referring to FIG. 4, when the base and the handset enter the communication mode and a code is transmitted to the base, the base immediately checks if the code is a dialing code, i.e., a key number of the handset or not. Thereafter, it enters the following procedures. At first, it sets an identification code for the key number of the handset. There are several identification code setting methods. For example, the key number identification code is determined subject to its dialing order, i.e., when one number key of the handset is clicked, the identification code is automatically added by 1 (block 41). The identification code and the respective key number are transmitted to the base several times for example six times (block 42). Because each key number is accompanied with a respective identification code, it is not necessary to worry about of the problem of a repeated dialing.

If the key of the handset which is clicked is not a number key but a function key, the identification code of the key is set by 0 (block 43) to reset the handset identification code stored in the memory unit 31 (see FIG. 3). Before dialing a telephone number, the user may click "Call" or another equivalent function key, and the identification code stored in the memory unit 31 is reset when "Call" or another equivalent function key is clicked.

When the base receives a zero identification code, it is judged not a dialing code. At this time, the base sets the identification code by hexadecimal F (block 47) to clear the identification code stored in the memory unit 32 of the base. Normally, a series of dialing number does not surpasses 16 numbers. If necessary, a code of greater value may be used. After setting of the identification code, the received function code is decoded and executed.

When a code is received from the handset by the base and identified to be a key number, it immediately proceeds to the following procedure: if the identification code of the key number is not equal to the identification code stored in the base, the identification code of the key number is set as the identification code of the base, i.e., the identification code of the key number of the handset is stored in the memory unit 32 of the base (see FIG. 3).

Transmitting a key number from the handset to the base repeatedly prevents a miss of a particular key number. Further, it is not necessary to make a time delay after a key number has been transmitted from the handset to the base. Because an identification code is accompanied with each key number, repeatedly transmitting a key number from the handset to the base does not cause the base to dial a particular number repeatedly. The handset has a buffer memory for storing a clicked key number before transmitting to the base, therefore a high dialing speed does not cause a miss of the transmission of clicked key numbers from the handset to the base.

Referring to FIG. 3, the transmission of a key number and the accompanied identification code from the handset to the base is controlled by the microcontroller 101 of the handset. The microcontroller 101 drives the modulator and transmitter circuit 102 to modulate the key number and the accompanied identification code into a radio signal, enabling it to be sent to the base of the wireless telephone by radio through the transmitting antenna 103. The radio signal is then received by the receiving antenna 104 of the base, then demodulated by the receiver and demodulator circuit 105 into a digital signal, and then the microcontroller 106 drives the dialing circuit 107 to dial the digital signal.

Figure 5:
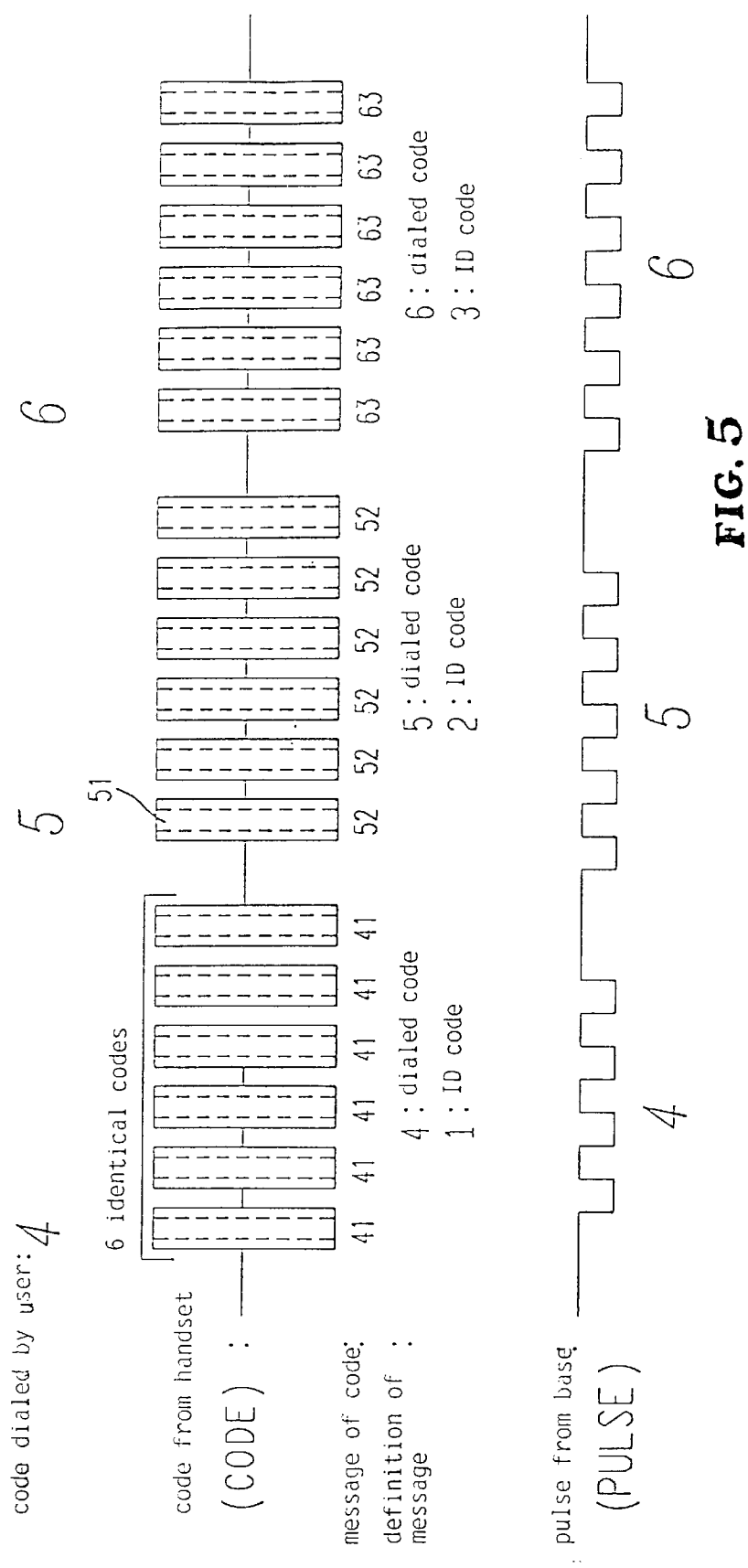
FIG. 5 illustrates a data format example according to the present invention.

Referring to FIG. 5, when the user clicks for example the key numbers 4, 5 and 6, the handset sets the identification code "1" for the key number 4, and sends the transmission code 51 repeatedly by 6 times, i.e., "41,41,41,41,41,41". Upon receipt of the transmission code from the handset, the base dials a corresponding pulse to the telecommunication company through the dialing circuit. If one combination code "41" is effectively decoded by the base, the key number "4" is immediately dialed, and the other identical five combination codes are rejected. This method eliminates the interference of noise, and assures an accurate transmission of the transmission code. In the same manner, "2" and "3"

are respectively set as an identification code for the key number 5 and the key number 6.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A wireless telephone dialing method in which when the handset of a wireless telephone transmits a key number to the base of the wireless telephone, the handset is driven to set an identification code for the key number, permitting the identification code to be transmitted with the key number to the base repeatedly for a number of times, and the base is driven to set the identification code stored therein as the identification code of the key number when the identification code stored therein is unequal to the identification code of key number received from the handset and then to decode the received key number and then to dial the key number.

2. The wireless telephone dialing method of claim 1 wherein the setting of the identification code for the key number at the handset is controlled by a microcontroller installed in the handset, and the set identification code is stored in a memory unit of the microcontroller; the identification code for the key number is the order of the key number being clicked.

3. The wireless telephone dialing method of claim 2 wherein the key number and the accompanied identification code are modulated into a radio signal by a modulator and transmitter circuit in the handset by means of the control of the microcontroller of the handset, and then transmitted to the base through a transmitting antenna at the handset.

4. The wireless telephone dialing method of claim 3 wherein the radio signal transmitted from the transmitting antenna at the handset is received by a receiving antenna at the base, then demodulated into a digital signal by a receiver and demodulator circuit in the base, and then sent to a microcontroller in the base for dialing.

5. The wireless telephone dialing method of claim 4 wherein the receiver and demodulator circuit of the base is controlled by the microcontroller of the base to demodulate the radio signal of the key number received from the handset.

6. The wireless telephone dialing method of claim 4 wherein the microcontroller of the base drives a dialing circuit of the base to dial the digital signal of the key number received from the handset.

7. The wireless telephone dialing method of claim 1 wherein the identification code stored in the base is stored in a memory unit in the base, the memory of the base recording the value of the identification code stored in the base and comparing it with the value of a next identification code received from the handset.

8. The wireless telephone dialing method of claim 7 wherein when the identification code of the base is set as the identification code of the key number received from the handset, the identification code of the key number is stored in the memory unit of the base.

9. The wireless telephone dialing method of claim 1 wherein when the identification code of the key number received from the handset is equal to the identification code stored in the base, the base runs a function processing procedure.

* * * * *